Dec. 30, 1924.

R. C. OSGOOD

PULLER DEVICE

Filed Dec. 15, 1919

1,521,202

Inventor:
Robert C. Osgood.
by
Att'y.

Patented Dec. 30, 1924.

1,521,202

UNITED STATES PATENT OFFICE.

ROBERT C. OSGOOD, OF CLAREMONT, NEW HAMPSHIRE, ASSIGNOR TO SULLIVAN MACHINERY COMPANY, A CORPORATION OF MASSACHUSETTS.

PULLER DEVICE.

Application filed December 15, 1919. Serial No. 344,967.

*To all whom it may concern:*

Be it known that I, ROBERT C. OSGOOD, a citizen of the United States, residing at Claremont, in the county of Sullivan and State of New Hampshire, have invented certain new and useful Improvements in Puller Devices, of which the following is a full, clear, and exact specification.

My invention relates to puller devices. It has for its object to provide an improved means for pulling a gear or the like from its shaft, the same being especially adapted to use in connection with pinions and including improved means whereby such elements which are ordinarily driven upon a shaft may be removed therefrom quickly without marring the parts and with a minimum of effort on the part of the operator.

In the accompanying drawings, I have shown, for purposes of illustration, one embodiment which my invention may assume in practice.

In these drawings.

Figure 1:
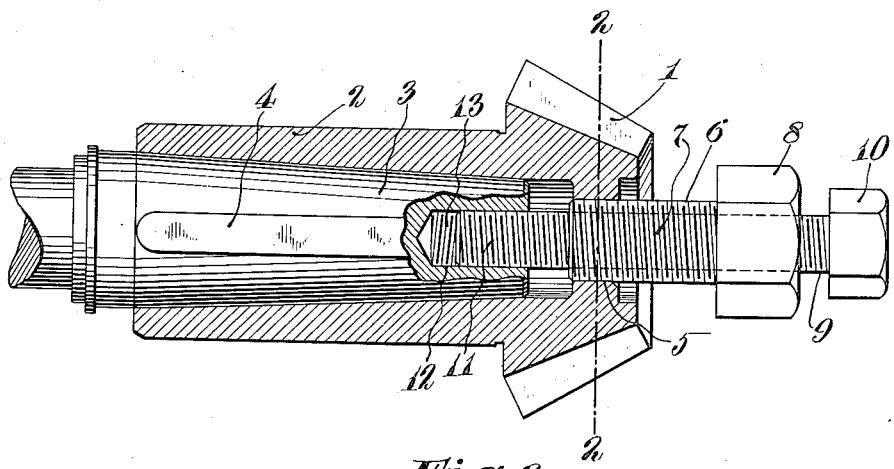
Fig. 1 is a longitudinal sectional view of this form of my improvement.
Figure 2:
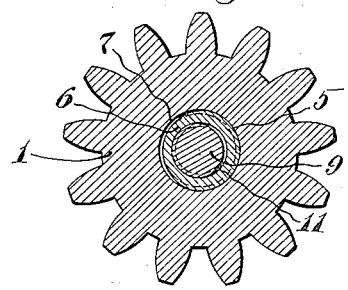
Fig. 2 is a transverse sectional view on line 2—2 of Fig. 1.

In this illustrative construction, it will be noted that I have shown a gear 1, herein in the form of a bevel pinion, having a sleeve 2 which in turn is internally tapered and driven upon the end of a tapered shaft 3, the sleeve 2 also being keyed to the shaft by a key 4. As shown, this pinion 1 is also provided with an axial threaded opening 5 adapted to receive a bolt 6 having on one end threads 7 cooperating with the threads in the opening 5 and having on its other end a turning head 8. This member 6 is in turn internally threaded in the same direction as the threaded portions 5 and 7 but with threads having a less steep lead. Carried in this member 6 and engaging with its threads is also an internal coaxially disposed bolt 9 having a turning head 10 on one end and throughout substantially the remainder of its length threaded, as at 11, with threads adapted to cooperate with the internal threads in the member 6. Here it will also be noted that the threaded portion 11 of this member 9 extends through the member 6 and engages the end of the shaft 3 as an abutment, the same herein extending into a coaxial recess 12 formed in the end of the shaft and threaded, as at 13, to receive the threaded end of the member 9, though such a threaded recess may be omitted if desired.

In the use of my improvement, the differential effect arising from the difference in lead of the several threads is used to loosen the pinion. More specifically, it will be noted that by turning the head 8 in such a manner as to bring the threaded portion 7 into registry with the threaded portion 5 in the pinion, the parts are so adjusted that rotation of the head 10 will cause the member 9 to be moved into engagement with the end of the recess in the shaft. When the parts have been so adjusted, it will also be evident that a rotation of the head 8 will then cause the member 6 to be moved inward on the member 9 and that this rotation of the member 6 will cause the pinion 1 to be moved outward relative to the member 9, the pinion moving outward at a speed equal to the difference between the speed of movement of the member 6 and the member 9. More specifically, it will be noted that, when the member 6 is threaded in such a manner as, when rotated through a complete revolution, to move 1/7 of an inch, and the member 9 is so threaded as, when rotated through a complete revolution, to move 1/10 of an inch, the adjustment of the member 6 relative to the member 9, as described, will cause the pinion to be moved outward at a speed of 3/70 of an inch for each complete revolution of the member 6.

As a result of my improvement, it has been found that even the hardest driven pinion may be removed without marring any parts and with great facility, thereby materially reducing the time heretofore consumed in the removal of such a part. It will also be evident that due to the simplicity of my improved means, the same may be applied at small expense wherever desired and adapted to remove various elements.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In a pulled device, a plurality of coaxially disposed threadedly interengaged members, the outer one of which is adapted to move relative to the other during operation of the device and which has external threads of a greater lead than the threads between said members.

2. In a means for removing a stuck gear from a shaft, a pair of members operatively connected during removal of a gear respectively together and to the gear by threads of different lead, the member threadedly connected to the gear being movable relative to the other to release said gear.

3. In a mechanism for removing a stuck member from a shaft, a pair of coaxially disposed elements adapted to be operatively connected to the elements to be separated by threads of different lead and threaded to one another.

4. In a device for separating a pair of members, one of which is stuck to the other, a pair of elements adapted to be operatively connected to said members by threads of different lead and threaded to one another by threads of the same lead as those on one of said members.

5. In a device for separating a pair of members, one of which is stuck to the other, a pair of elements adapted to be operatively connected to said members by threads of different lead and threaded to one another by threads of the same lead as those on the element from which the other element is to be removed.

6. In a mechanism for removing a stuck gear from a shaft, members threaded during removal of a gear respectively to the gear and shaft and one adjustable in one direction relative to the other to move the gear in an opposite direction.

7. In a mechanism for removing a stuck gear from a shaft, coaxially disposed members adapted to be threaded respectively to the gear and shaft and one adjustable in one direction relative to the other to move the gear in the opposite direction.

8. In a mechanism for removing a stuck gear from a shaft, a pair of coaxially threaded members one adapted to be threaded to the gear and the other adapted to be threaded to the shaft and both threaded together, the first of said members having threads of steeper lead engaging said gear.

9. In a mechanism for removing a gear from a shaft, a pair of cooperating threaded members threaded during removal of a gear respectively to the shaft and to the gear and threaded to each other and having the threads between one of the same and the gear of different lead from the other threads.

10. In a mechanism for removing a gear from a shaft, a bolt adapted to be threaded in the shaft, a coaxial bolt threaded on the first mentioned bolt and adapted to be threaded to the gear, the threads between the last mentioned bolt and gear being of steeper pitch than the threads between the first mentioned bolt and shaft and between said first mentioned bolt and said last mentioned bolt.

11. In a means for separating a stuck member and a shaft, a pair of elements one of which is adapted to abut against one of said first mentioned members and the other of which is adapted to threadedly engage the other of said first mentioned members, said first mentioned element engaging said second mentioned element with threads of a different pitch from those with which the latter engages the member to which it is threaded, and means for turning said second mentioned element relative to said first mentioned element to separate the shaft and the member stuck thereon.

12. In a means for effecting separation of a pair of stuck elements, a pair of cooperating members operatively connected during coaction to each other and to the element which is to be moved by threads of different lead, said last mentioned threads being of steeper lead and the member provided with said last mentioned threads being rotatable relative to the other.

13. In a means for removing a stuck member from a member on which it is disposed, a pair of coaxially disposed elements operatively threaded together, one of which is, threaded to and adapted to be simultaneously moved with said stuck member, while the other element is engagable with the second mentioned member and remains stationary during removal of said stuck member, the threads between said elements being of less pitch than the threads between one of said elements and said stuck member, and means to rotate said member threaded to said stuck member for releasing the latter.

14. In a mechanism for removing a stuck member from a member on which it is disposed, a pair of cooperating relatively movable elements, one of which is adapted to engage said second mentioned member and to remain stationary during removal of said first mentioned member and the other of which is adapted to move both relative to said first mentioned member and to the other or stationary element, said parts being so formed that their cooperation causes movement of said member to be removed equal to the difference in movement in the line of removal between the movement of said movable element relative to the stationary element and the movement of said movable element relative to said member to be moved.

15. In a means for breaking a joint between a pair of stuck surfaces, a pair of threadedly interengaged elements, one of which is adapted to be engaged with threads whose bodily longitudinal movement is accompanied by movement of one of said stuck surfaces relative to the other, and the other of which is engageable with a surface in fixed spaced relation to the other of said stuck surfaces, and means for rotating the first mentioned one of said elements to release said surfaces, the threaded engagements specified being with threads of different leads.

16. In a mechanism for removing a stuck gear from a shaft, a pair of coaxially threaded members one adapted to be threaded to the gear and the other engageable with the shaft and both threaded together, the first of said members having threads of different lead engaging said gear.

17. In a mechanism for removing a stuck gear from a shaft, coaxially disposed members, one of which is adapted to be threaded to said gear while the other engages the shaft, and one of which is adjustable in one direction relative to the other to move said gear in the opposite direction.

In testimony whereof I affix my signature.

ROBERT C. OSGOOD.